Patented Nov. 7, 1950

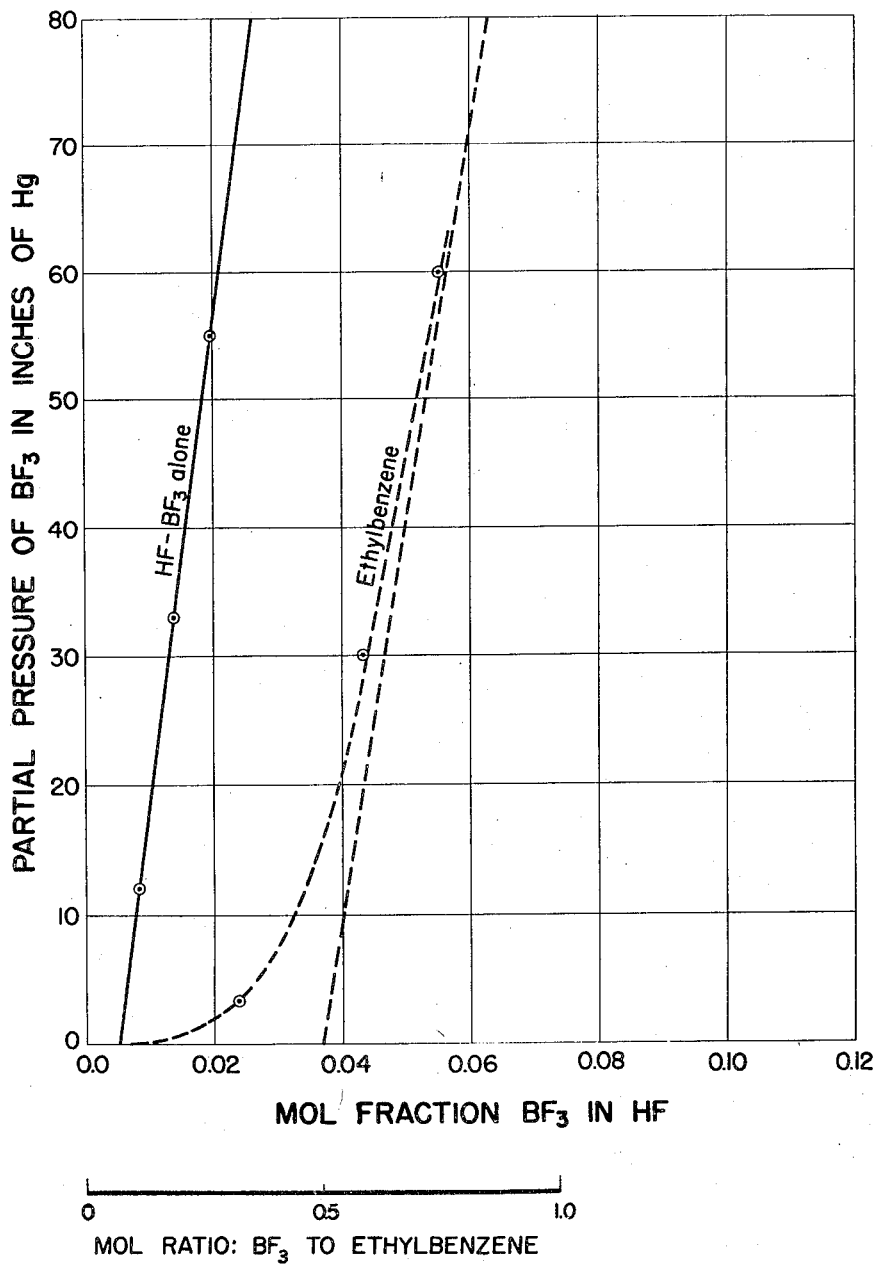

2,528,893

UNITED STATES PATENT OFFICE 2,528,893

ETHYLBENZENE CONVERSION

Arthur P. Lien, Hammond, Ind., and David A. McCaulay, Chicago, Ill., assignors to Standard Oil Company, Chicago, Ill., a corporation of Indiana Application August 25, 1948, Serial No. 46,137

6 Claims. (Cl. 260—672)

This invention relates to a process for the disproportionation of ethylbenzene to produce benzene and $C_{10}$ aromatic hydrocarbons. More particularly, this invention is concerned with a process for the conversion of ethylbenzene in high yields to meta-diethylbenzene.

We have made the observation that ethylbenzene undergoes disproportionation with surprising ease in the presence of liquid hydrogen fluoride and $BF_3$ to produce chiefly benzene and meta-diethylbenzene.

One object of our invention is to provide a process for the disproportionation of ethylbenzene. Another object of our invention is to provide a process for the preparation of meta-diethylbenzene. Still another object of our invention is to provide a process for the preparation of meta-diethylbenzene wherein the catalyst functions also as a selective solvent for the meta-diethylbenzene. These and other objects of our invention will become apparent from the ensuing description thereof.

We have found that ethylbenzene can be disproportionated in the presence of liquid hydrogen fluoride and $BF_3$ in accordance with the following equation:

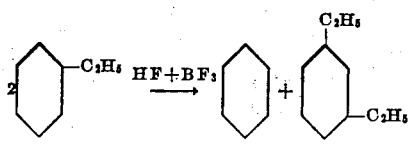

and that the benzene produced in the reaction is substantially insoluble in the liquid hydrogen fluoride and $BF_3$ whereas the meta-diethylbenzene is preferentially dissolved in the liquid hydrogen fluoride-boron fluoride catalyst phase. Any unreacted ethylbenzene is insoluble in the acid phase.

It is well known in the art that Friedel-Crafts catalysts will activate the disproportionation of ethylbenzene. However, it is also known that when catalysts of this type are used the equilibrium for the reaction,

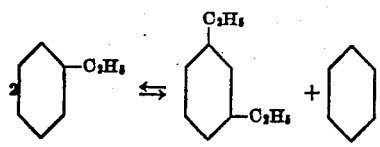

is displaced to the left, so that when appreciable quantities of benzene are produced or present, very little diethylbenzene is formed. This is illustrated by an experiment in which 3.0 moles of benzene and 1.5 moles of diethylbenzene were maintained at 205–210° F. for 3.0 hours in the presence of $AlCl_3$. The original diethylbenzene was more than half converted to ethylbenzene in this experiment.

Through the proper use of the $BF_3$-HF catalyst, we can obtain a very rapid reaction at ordinary atmospheric temperatures and are able to shift the thermodynamic equilibrium, depicted above, to effect a substantially quantitative conversion of ethylbenzene into meta-diethylbenzene and benzene. This is illustrated by the following example.

EXAMPLE

The reaction system comprised a $BF_3$ storage cylinder, a $BF_3$ metering flask, and a reaction flask individually valved to a manifold of copper tubing which was suitably attached to an evacuation pump. A pressure gage was also attached to the copper manifold line. Liquid hydrogen fluoride, 114.5 g. (5.725 mols), and ethylbenzene (B. P.=136° C.; $n_D^{20}=1.4954$), 44 g. (0.415 mol), were introduced into the reaction flask. The flask was then attached to the vacuum system, its contents frozen down with liquid nitrogen, the whole system evacuated and the valve to the vacuum pump closed. Boron fluoride was then passed into the system from the storage cylinder and allowed to fill the metering flask. The valve of the reaction flask was then opened and increments of $BF_3$ to a total of 25 g. were condensed in the reaction flask. After the addition of each increment of $BF_3$, the valve of the $BF_3$ metering flask was closed and the reaction flask was allowed to warm to 0° C. in a water-ice bath, agitated and allowed to come to equilibrium and the pressure read on the gage. The following data were thus obtained:

Table

| Weight $BF_3$ added (g.) | Total Press. at 0° C. (in. of Hg) | Mols $BF_3$ in liq. | Mol fraction $BF_3$ in liq. | Partial Press. of $BF_3$ (in. of Hg) |
|---|---|---|---|---|
| 9.4 | [1] 17.5 | 0.135 | .0236 | 3.5 |
| 18.8 | 44 | 0.252 | .0440 | 30 |
| 25.0 | 74 | 0.318 | .0556 | 60 |

[1] Pressure was 55″ Hg at start. On shaking for 15 minutes at 0° C. it gradually fell to 17.5″ Hg.

The mol fraction of $BF_3$ was plotted against its partial pressure, as shown in the figure. From the figure, it can be calculated that 0.207 mol of $BF_3$ were required in the hydrocarbon complex, which is exactly one-half the number of mols of ethylbenzene charged. The HF and $BF_3$ were flashed from the reaction mixture and the residual hydrocarbon layer was fractionated in a wire gauze-packed column (equivalent to 30 plates) and found to have the following composition:

|  | Volume per cent | Mol per cent |
| --- | --- | --- |
| Benzene | 28 | 40 |
| Ethylbenzene | 5 | 5 |
| Diethylbenzene | 67 | 55 |

The diethylbenzene had inspections corresponding to those given by A. P. I. Project 45 data for 1,3-diethylbenzene. The ultraviolet spectrum of our product was identical with that of 1,3-diethylbenzene. These data show that the ethylbenzene was almost completely converted into benzene and diethylbenzene. This is unexpected since it appears to be contrary to the product distribution predicted by previous information concerning the equilibrium constant. It can be explained, however, upon the basis that diethylbenzene forms a complex with $BF_3$ and $HF$ (containing one mole of $BF_3$ per mole of diethylbenzene), that this complex is selectively soluble in the hydrogen fluoride layer and is thus removed from further reaction and the ethylbenzene disproportionation equilibrium is thereby shifted to the right. In more precise language, the equilibrium constant for the acid phase reaction is many hundred times greater than the equilibrium constant for the hydrocarbon phase reaction.

In the ethylbenzene disproportionation reaction, we employ at least about 0.3 mol, preferably approximately 0.5 mol, of $BF_3$ per mol of ethylbenzene in the charging stock; if less is used substantially quantitative conversion will not be attained. More than 0.5 mol of $BF_3$ per mol of ethylbenzene may be employed if desired. In general, a molar excess of liquid hydrogen fluoride may be employed in carrying out the disproportionation of ethylbenzene. Although the hydrogen fluoride concentration may be varied between about 10 and about 500 volume percent based on the charging stock, we prefer to employ between about 50 and about 300 volume percent. The disproportionation reaction may be effected in the presence of unreactive hydrocarbons, e. g., saturated hydrocarbons, such as butane, pentanes, hexanes, octanes, cyclopentane, methylcyclopentane, dimethylcyclopentane, hexane, methylcyclohexane, saturated naphthas and the like, these being essentially insoluble in the liquid hydrogen fluoride-$BF_3$ employed as the catalyst and solvent medium for the $C_{10}$ aromatic hydrocarbons produced in the disproportionation of ethylbenzene. Benzene and toluene are substantially insoluble in liquid HF-$BF_3$ under our reaction conditions and may likewise be employed as unreactive diluents.

The disproportionation of ethylbenzene may be effected at temperatures between about 0° F. and about 175° F. or even higher, preferably at about 30° F. to about 150° F.

In carrying out the process, the ethylbenzene charging stock, alone or in admixture with unreactive hydrocarbons may be intimately contacted with the HF-$BF_3$ catalyst by conventional contacting or agitating means under a pressure sufficient at least to maintain the liquid phase, and the reaction mixture withdrawn to a settling zone, centrifuge or the like to separate a raffinate layer containing said unreactive hydrocarbons, benzene produced in the disproportionation operation and unconverted ethylbenzene, and an acid layer containing liquid hydrogen fluoride, $BF_3$, and diethylbenzene. The hydrogen fluoride and $BF_3$ can be distilled or flashed from the acid layer and reused in the disproportionation operation and the residual hydrocarbons separated from the acid layer can be subjected to purification treatments such as fractional distillation, washing with water or alkaline solutions, or other conventional methods of removing fluorides. The raffinate layer may be stripped of HF and $BF_3$ which are returned to the ethylbenzene disproportionation operation.

The diethylbenzene produced is substantially one isomer, namely meta-diethylbenzene, which is valuable as a pure chemical and especially valuable as a motor fuel component, as will appear from the following table from which its octane number is compared with that of ethylbenzene.

|  | CFR-R Octane No. | |
| --- | --- | --- |
|  | Clear | Blending |
| 1,3-diethylbenzene | isooctane +3cc. TEL | 155 |
| Ethylbenzene | isooctane +0.8 cc. TEL | 124 |

Meta-diethylbenzene has the highest known CFR-R blending octane number of any dialkylbenzene. It is obvious, also, that meta-diethylbenzene can be used as a component of "safety fuel."

Having thus described our invention, what we claim is:

1. A process for the disproportionation of ethylbenzene to produce meta-diethylbenzene in a quantity in substantial excess of the thermodynamic equilibrium quantity, which process comprises contacting ethylbenzene in the absence of other reactive hydrocarbons with at least about 10 volume percent of liquid hydrogen fluoride and with at least about 0.3 mol of $BF_3$ per mol of ethylbenzene at a temperature between about 0° F. and about 175° F. under a pressure sufficient at least to maintain a liquid phase and separating benzene and meta-diethylbenzene from the reaction products.

2. A process for the disproportionation of ethylbenzene which comprises contacting ethylbenzene in the absence of other reactive hydrocarbons in a reaction zone with at least about 10 volume percent of liquid hydrogen fluoride and with at least about 0.3 mol of $BF_3$ per mol of ethylbenzene at a temperature between about 0° F. and about 175° F. under a pressure sufficient at least to maintain a liquid phase, withdrawing at least a portion of the reaction mixture to a settling zone, withdrawing from said settling zone a solution comprising hydrogen fluoride, $BF_3$ and meta-diethylbenzene, and recovering said meta-diethylbenzene from said solution.

3. The process of claim 2 wherein at least about 0.5 mol of $BF_3$ is maintained in the reaction zone per mol of ethylbenzene charged.

4. A process for the disproportionation of ethylbenzene which comprises contacting ethylbenzene in the absence of other reactive hydrocarbons in a reaction zone with at least about 10 volume percent of liquid hydrogen fluoride and with at least about 0.3 mol of $BF_3$ per mol of ethylbenzene at a temperature between about 0° F. and about 175° F. under a pressure sufficient at least to maintain a liquid phase, withdrawing at least a portion of the reaction mixture to a settling zone, separately withdrawing from said settling zone a hydrocarbon layer comprising benzene and a solution comprising hydrogen fluoride, BF₃ and meta-diethylbenzene, and separately recovering benzene from said hydrocarbon layer and meta-diethylbenzene from said solution.

5. The process of claim 4 wherein about 0.5 mol of BF₃ is maintained in the reaction zone per mol of ethylbenzene charged and the reaction temperature is between about 30° F. and about 150° F.

6. A process for the substantially quantitative disproportionation of ethylbenzene to produce benzene and meta-diethylbenzene to the substantial exclusion of other diethylbenzenes, which process comprises contacting ethylbenzene in the absence of other reactive hydrocarbons, with between about 50 and about 300 volume percent of liquid hydrogen fluoride and with between about 0.3 and about 0.5 mol of BF₃ per mol of ethylbenzene at a temperature between 30 and 150° F. under a pressure sufficient at least to maintain a liquid phase, allowing at least a portion of the reaction mixture to settle to produce a hydrocarbon layer comprising benzene and a solution comprising hydrogen fluoride, BF₃ and meta-diethylbenzene, and separately recovering benzene from said hydrocarbon layer and meta-diethylbenzene from said solution.

ARTHUR P. LIEN.
DAVID A. McCAULAY.

REFERENCES CITED

The following references are of record in the file of this patent:

UNITED STATES PATENTS

| Number | Name | Date |
|---|---|---|
| 2,396,965 | Passino | Mar. 19, 1946 |
| 2,397,495 | Lien et al. | Apr. 2, 1946 |
| 2,418,689 | Benedict et al. | Apr. 8, 1947 |